May 10, 1927.
C. E. SWENSON
1,628,006
DIRECTION AND TEMPERATURE INDICATING DEVICE
Filed May 17, 1926      2 Sheets-Sheet 1
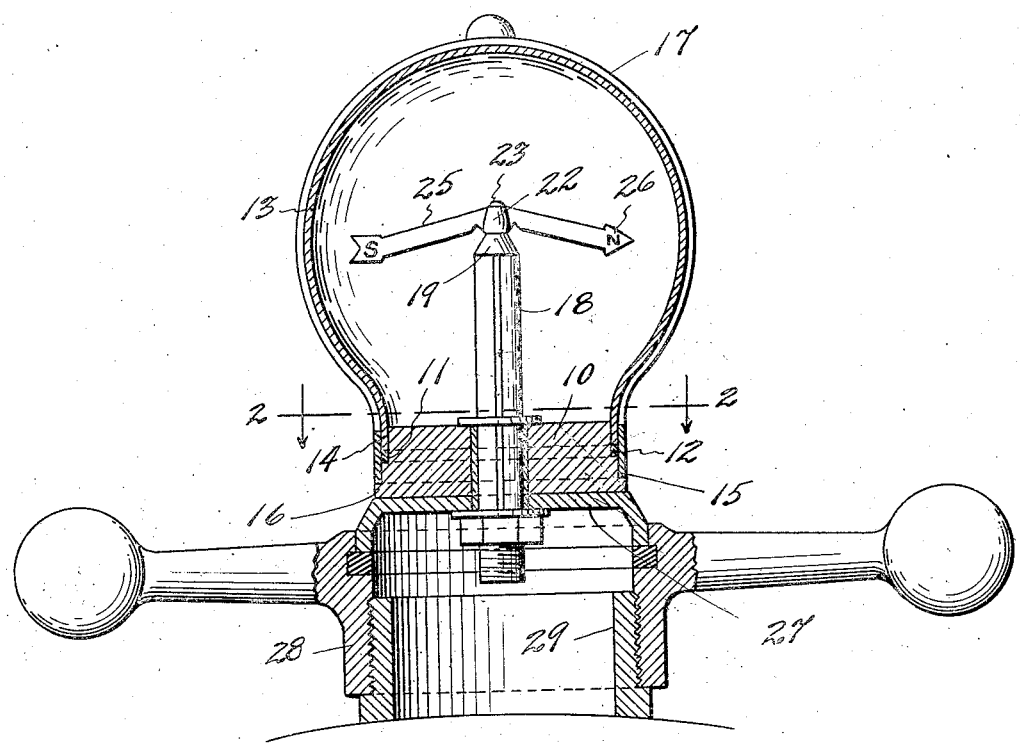
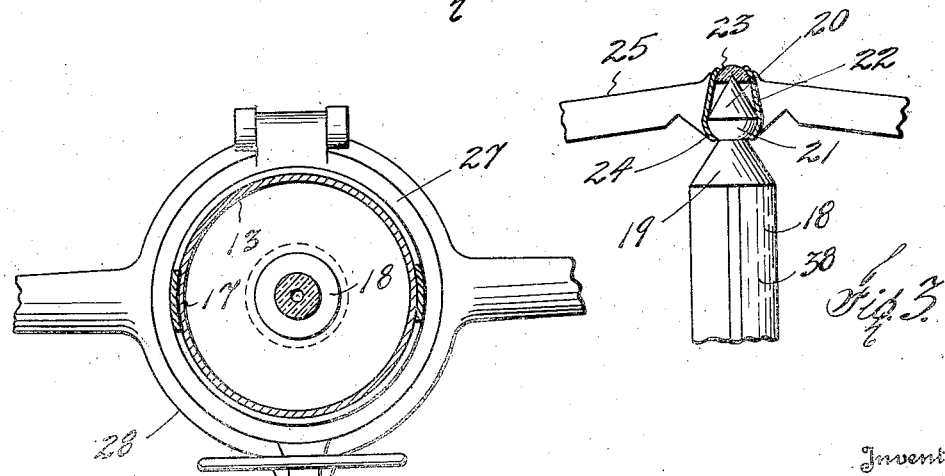
Inventor
C. E. Swenson
By Jack A. Ashley
Attorney May 10, 1927.
C. E. SWENSON
1,628,006
DIRECTION AND TEMPERATURE INDICATING DEVICE
Filed May 17, 1926     2 Sheets-Sheet 2
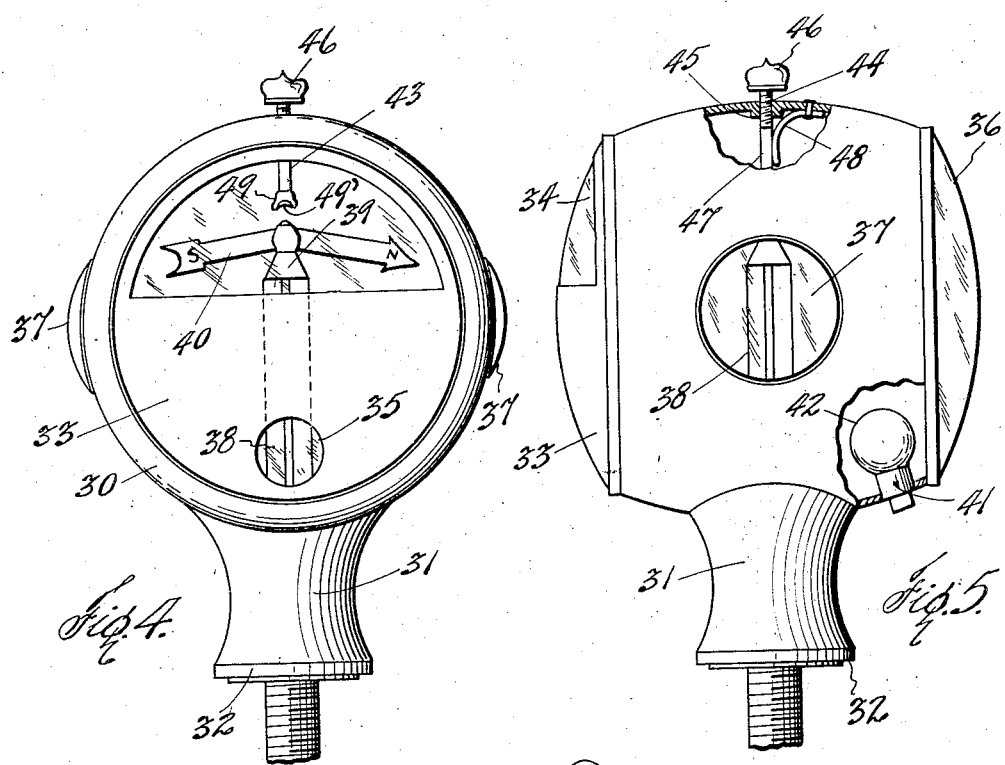
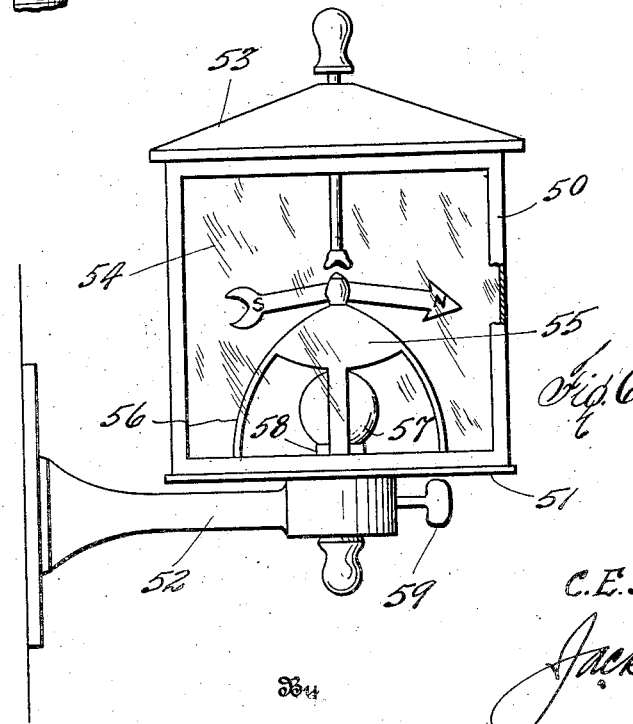
Inventor
C. E. Swenson Patented May 10, 1927.

1,628,006

UNITED STATES PATENT OFFICE.

CARROLL E. SWENSON, OF CLIFTON, TEXAS.

DIRECTION AND TEMPERATURE INDICATING DEVICE.

Application filed May 17, 1926. Serial No. 109,457.

This invention relates to new and useful improvements in direction and temperature indicating devices.

The object of the invention is to provide an instrument arranged to be mounted on a motor vehicle, motor boat or other carrier, to indicate direction by means of a magnetic needle.

A further object is to combine said magnetic needle with a thermometer for indicating the temperature of the water in a radiator.

Another object of the invention is to provide a magnetic needle in connection with a lamp and a fastener for holding the needle against operation and vibration.

Another object is to mount the magnetic needle in a protecting transparent housing and to secure the needle so that it cannot be dislodged from its pivot.

A still further object of the invention is to provide a device which will be ornamental and may be used as a decoration and which may be combined with other articles of decoration.

An important object of the invention is to provide the fastener with a soft tip for engaging the needle and thus preventing injury to the said needle and its jewel mounting.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a vertical sectional view of a device constructed in accordance with my invention and mounted on a radiator cap, Fig. 2 is a cross-sectional view on the line 2—2 of Fig. 1, Fig. 3 is an enlarged detail of the post and needle mounting, Fig. 4 is a front elevation of a device constructed in accordance with the invention and equipped with the needle fastener and a lamp, Fig. 5 is a side elevation of the same, a portion being in section, and Fig. 6 is a side elevation of a modified form.

This application is a continuation in part of my former application filed August 22, 1924, Ser. No. 733,487.

In the drawings, the numeral 10 designates a circular flat base which may be made of any suitable non-magnetic material such as white metal and formed to prevent magnetic influence upon a compass needle. The base has a reduced upper portion, whereby an annular shoulder 11 is provided. On the shoulder is seated an annular packing gasket 12 of suitable material for the purpose.

A transparent housing 13 in the form of a spherical glass globe or equivalent, has a contracted collar 14 at its bottom fitting around the reduced portion of the base and resting upon the gasket. A split metal ring 15 fits snugly around the base and the collar and is supported upon a flange 16 at the bottom of the base. A strap or keeper 17 made integral with the ring fits over the globe and holds the same in place. The ring is suitably fastened to the base and the ends of the strap are fixed to opposite sides of the ring so as not to obscure the vision through the globe from the driver's seat.

A vertical post 18 extends up through the center of the base into the globe and has a cap 19 on its upper end. The cap is conical and at its apex has a bearing point 20 provided with an undercut semi-circular boss 21. On the bearing point is mounted a hub 22 having a jewel-bearing 23 in its upper end resting upon the apex of the point 20. The hub has an inwardly curved skirt 24 surrounding the boss 21, but spaced sufficiently therefrom to permit a free swinging and tilting movement of the hub, but close enough to prevent displacement of said hub. The hub is united in the center of a magnetic needle 25.

The needle is made of steel, while the hub is formed of brass or some metal suitable for the purpose. The extensions of the needle are inclined downwardly from the hub and the "north" end of the needle is provided with a head 26 and may bear the letter "N," while the opposite end of the needle may carry the letter "S." The needle is supported in the central portion of the globe so as to be clearly visible. I prefer to coat the needle, which may be made of thin metal, with any suitable luminous preparation, whereby it will be visible at night, but this is not essential.

I have shown the post 18 in the form of a thermometer which extends through the base 10 and also serves to hold the base on a radiator cap 27 which is hinged to a collar 28 mounted on the neck 29 of the radiator. The base of course may be mounted on any style of cap and the post 18 need not be a thermometer, but as a thermometer is a most useful accessory to a radiator, the combination of the magnetic needle and the thermometer makes a compact and efficient device.

In Figs. 4 and 5 I have shown a modified or other form of the invention which comprises a housing 30 having a reduced collar 31 at its bottom which is provided with an annular base 32. The housing has a front cap 33 provided with a glass window 34 in its upper half and a glass covered port 35 in its lower central portion. A transparent circular cap 36, preferably of glass, covers the rear of the housing and through which the interior of the housing may be observed from the driver's seat. The housing is also provided with lenses 37 on each side, which may be colored if desired.

A vertical post 38 extends into the housing from the collar 31. The upper end of the post is reduced and has mounted thereon a bearing cap 39 like the cap 19. The cap is conical and has a bearing point 20 as is shown in Fig. 3. On the bearing point is mounted a hub 22 having a jewel bearing 23 in its upper end journaled upon the apex of the point 20. The hub has an inwardly curved skirt 24 surrounding an undercut semi-circular boss 21 at the base of the bearing point. The hub and skirt are spaced sufficiently from the point and boss to permit a free swinging and tilting movement as has hereinbefore been described. The hub is incorporated in the center of a magnetic needle 40 which may be the same as the needle 25 or which may be otherwise constructed.

In the base of the housing between the cap 36 and the post 38 an electric lamp socket 41 is mounted and a lamp 42 is fastened in the socket for the purpose of illuminating the interior of the housing. One of the important features of this form of the invention is a fastener for securing the needle against movement when it is not desired to use the same. This fastener consists of a stem 43 having an upper screw-threaded portion 44 engaging in a boss 45 and extending through the top of the housing. The stem has a button 46 on its upper end by which it may be rotated. Below the screw-threaded portion 44 the stem has a plurality of flat sides or panels 47 engaged by a flat spring 48 secured to the top of the housing, whereby said stem is held against rotation except by displacement of the spring. On the lower end of the stem a cap 49 is secured and the bottom of this cap is provided with a concave lining or tip 49' of soft metal, such as Babbitt or other suitable material, for engaging the top of the jewel bearing 23. By this arrangement the needle may be fastened against movement and so held without injury.

In Fig. 6 I have shown a device constructed in accordance with the invention but more especially adapted for use in a closed car or in the cabin of a motor boat. In this form, a rectangular housing 50 having a base 51 is mounted on a bracket 52 which may be secured to a wall. The housing has a top 53 and is provided with transparent side walls 54. As a thermometer is not required in this form, a stool 55 is mounted within the housing and has curved legs 56. An electric lamp 57 is mounted in a socket 58 within the stool. The socket is secured in the base 51 and is suitably connected with a switch 59 disposed in the outer end of the bracket 52. The upper end of the stool 55 is conical and the point 20 with its boss 24 are mounted thereon. The needle 40 and the stem 43 of Figs. 4 and 5 are duplicated in this form and further description is considered unnecessary.

In each instance the housing is made substantially air-tight and is insulated so far as is possible, from disturbing influences so that the needle may operate under favorable conditions. As before stated, the post 18 or 38 need not be a thermometer and the needle may be supported in other ways as is shown in Figure 6. Owing to the vibration of the vehicle it may be found desirable to fasten the needle and only to release the same when it is desired to ascertain directions, and while I have illustrated one form of fastener, the invention is not to be limited to such a form and any suitable fastening may be employed. It is also pointed out that any compass medium may be used in place of the needle and the interior of the housing may be equipped with the usual compass dial, (not shown). White metal has been found to be less attractive to the needle and may be used satisfactorily in constructing the housing and other parts.

In operation the head of the needle being attracted by the earth's magnetism seeks a northerly direction, thus giving the general direction of north, south, east and west. Where a thermometer is used in the post the device at the same time serves as a temperature indicator for the motor. This device will be very useful in driving on cloudy days and at night when the electric lamp may be used as well as in strange places and provides a usefull as well as ornamental fixture.

Various changes in the size and shape of the different parts, as well as modifications and alterations may be made within the scope of the appended claims.

What I claim, is:

1. In a device of the character described, an upright housing having transparent sides and a top, a mounting for the housing, a supporting member extending upwardly in the housing, a bearing upon the upper end of the supporting member, a magnetic needle having a hub, the hub being rotatably mounted on the bearing and having a depending portion surrounding said bearing for confining it thereon, a fastener depending from the top of housing and having a member on its lower end for engaging the hub of the needle, and means over the top of the housing connected to the fastener for moving it vertically in the housing.

2. In a device of the character described, the combination of a non-magnetic base for mounting upon a radiator cap, a transparent housing secured on the base, a thermometer having its stem extending through the base and into the housing, and a magnetic needle rotatably confined on the upper end of the stem.

3. In a device of the character described, a base for mounting on a support, a transparent housing resting on the base, means for fastening the housing on the base, an upright post within the housing, having at its upper end a pivot with an undercut base, and a magnetic needle rotatably confined on the pivot by a depending portion to engage said undercut base.

4. In a device of the character described, a transparent housing, a support for the housing, a post in the housing on the support, a cap mounted on the upper end of the post having a point bearing and an under-cut semicircular boss, a hub having a jewel bearing resting upon the point bearing and provided with an inwardly curved skirt surrounding the boss, but spaced therefrom, and a magnetic needle in which the hub is confined.

5. In a device of the character described, a housing having transparent openings, a mounting for the housing, an upright support within the housing, a bearing point on the support, a magnetic needle having a central hub embracing said point and confined thereon and provided with a bearing engaging said point, a stem screw-threaded in the top of the housing, a button on the upper end of the stem above the housing, and a cap on the lower end of the stem having a lining for engaging the hub bearing.

6. In a device of the character described, the combination of a non-magnetic base for mounting upon a radiator cap, a transparent housing secured on the base, a thermometer having its stem extending through the base and into the housing, a magnetic needle rotatably confined on the upper end of the stem, a fastener mounted in the housing for engaging the bearing of the hub to hold the needle against movement, and means outside of the housing for operating the fastener.

7. In a device of the character described, a base for mounting on a support, a transparent housing resting on the base, means for fastening the housing on the base, an upright post within the housing, having at its upper end a conical pivot with an undercut base, a magnetic needle rotatably confined on the pivot by a depending portion to engage said undercut base, a fastener mounted in the housing for engaging the bearing of the hub to hold the needle against movement, and means outside of the housing for operating the fastener.

8. In a device of the character described, a transparent housing, a support for the housing, a post in the housing on the support, a cap mounted on the upper end of the post having a point bearing and an undercut semicircular boss, a hub having a jewel bearing resting upon the point bearing and provided with an inwardly curved skirt surrounding the boss, but spaced therefrom, a magnetic needle in which the hub is confined, a fastener mounted in the housing for engaging the bearing of the hub to hold the needle against movement, and means outside of the housing for operating the fastener.

9. In combination with a radiator cap, a base member, means for removably connecting the base member to the radiator cap, a post extended upward from the base member, a magnetized needle pivotally mounted upon the upper end of the post, a transparent housing having its lower end constructed to form an open ended neck mounted upon the base member, a horizontally disposed band ring engaging the peripheral face of the base member and the neck portion of the transparent housing, a vertically disposed retaining band engaging the outer face of the housing, and said retaining band having its lower end connected to the horizontally disposed ring band.

In testimony whereof I affix my signature.

CARROLL E. SWENSON.